Figure 1:
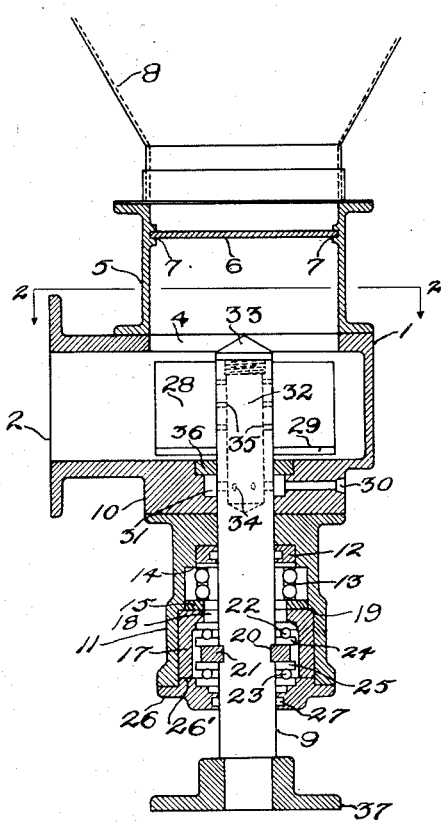

May 22, 1928.

C. M. SCHAEFFER

CONVEYING APPARATUS

Filed Dec. 27, 1926

1,670,383

2 Sheets-Sheet 1

INVENTOR
C. M. SCHAEFFER
BY
ATTORNEY

May 22, 1928.
C. M. SCHAEFFER
1,670,383
CONVEYING APPARATUS
Filed Dec. 27, 1926
2 Sheets-Sheet 2
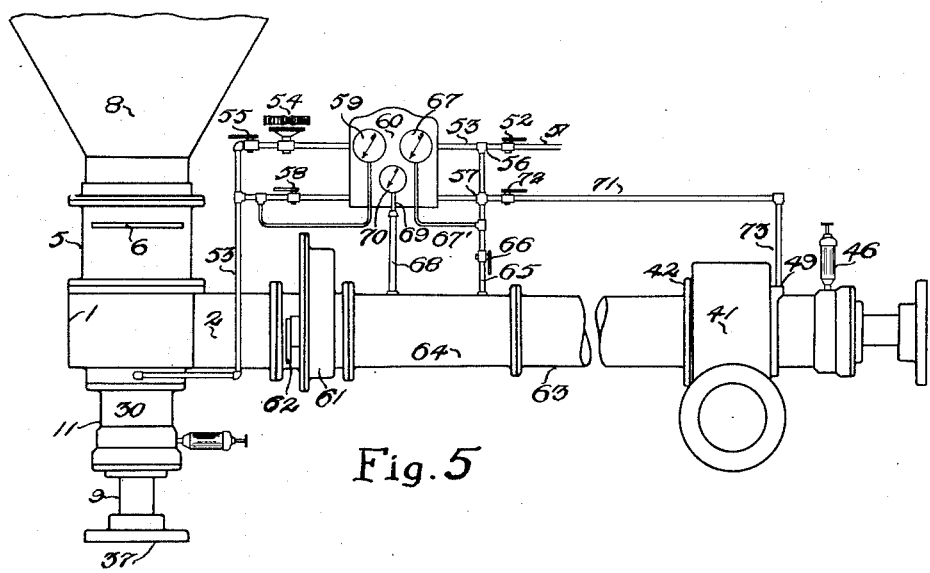
Fig. 5
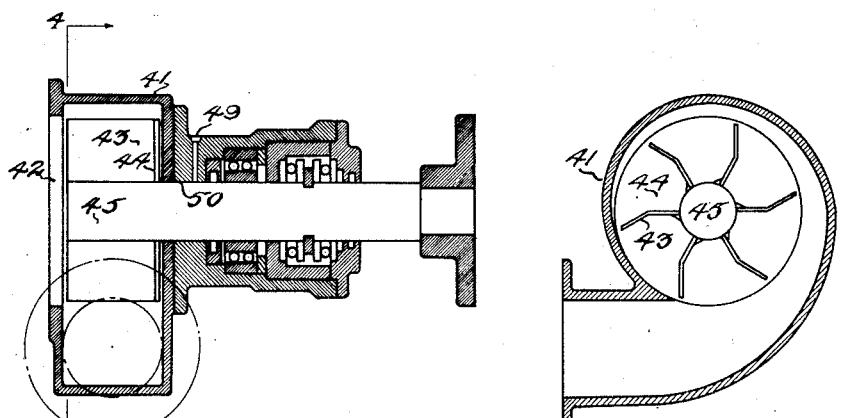
Fig. 3
Fig. 4
INVENTOR
C. M. SCHAEFFER
BY
ATTORNEY Patented May 22, 1928.

1,670,383

UNITED STATES PATENT OFFICE.

CHARLES M. SCHAEFFER, OF ALLENTOWN, PENNSYLVANIA, ASSIGNOR TO FULLER COMPANY, A CORPORATION OF PENNSYLVANIA.

CONVEYING APPARATUS.

Application filed December 27, 1926. Serial No. 157,179.

This invention relates to the conveying of pulverized or finely divided materials and more particularly to an improved conveying apparatus for transporting such materials through pipe lines or closed conduits of extended length. Examples of such materials are raw and finished cement, pulverized coal, lime, starch, gypsum and kindred materials in a relatively fine state of subdivision.
It has been discovered that nearly all relatively dry, finely divided materials assume many of the characteristics of sluggish liquids when intimately mixed with a small quantity of gas, such as air, under proper conditions of pressure and volume. In the aerated condition, the materials have been increased, apparently, to approximately double their normal volume. The mass appears to be solid but upon agitation its fluent condition is very apparent. It may be forced or pumped through long pipe lines in a manner closely approximating the pressure pumping of liquids. It is probable that in the fluent state each particle attracts and is surrounded by a thin film of air which reduces internal friction in the mass and friction against the walls of the conveyer pipe line. In accordance with the prior art method of transporting or pumping pulverized or finely divided materials through pipe lines, large quantities have been transported through pipe lines over a mile in length and capacities as great as 300 tons per hour have been handled in a single system. The material is to be admitted at one end of the conveyer conduit and advanced under pressure for a short distance, then mixed with a relatively small quantity of air or other gas to create artificially the fluent condition above described and forced through the remainder of the conduit by the combined pressure of the advancing means and the normal expansion of the aerating medium. The material advancing means is usually a worm or screw so designed as to subject the material to a progressively increasing pressure to form a zone of compacted material between the point where the material is admitted to the system and the entrance of the pressure air. The screw has therefore a dual function, first, as a means of conveyance, and, second, to form a seal which functions as a check valve to resist the backward flow of air along the screw, which would cause the screw to slip past or merely churn the aerated mass and fail to deliver additional quantities to the pipe line and fail to force the material in the form of a relatively solid column through the line.

The movement of the material and the creation and movement of the densely packed mass forming the seal, before aeration, involves the absorption of considerable power by friction against the walls of that portion of the apparatus in which the screw rotates. It is accordingly an object of my invention to create the fluent condition immediately upon the admission of material to the apparatus so that friction will be reduced by applying mechanical pressure only to fluent masses; to reduce the volume and pressure of the air to an extent approaching the minimum limits necessary for the creation of the fluent state; to create the fluent condition by mechanical agitation in the presence of air; and to convey the material through the conduit or pipe line primarily by the mechanical pressure of a device designed to operate in and to exert force against the aerated mass.

Under certain conditions, for example, when some of the materials are conveyed through long pipe lines, around bends and through distributing valves which tend to resist the flow, there is a tendency of the materials and air to separate partially, thereby decreasing mobility and increasing the power consumption. It is accordingly a further object of my invention to recreate the fluent condition by mechanical agitation at a point or points remote from the primary conveying apparatus.

In accordance with my invention the pulverized material descends by gravity upon a rapidly rotating impeller moving within a guide casing of spiral form having a discharge section leading to a transport line. The material descends preferably at right angles to the plane of rotation of the impeller which consists of a number of blades secured to a hollow shaft and a disk at the side opposite to the entrance for the material. The blades are preferably curved in a direction contrary to the direction of rotation in order to increase the tendency of the material to discharge tangentially to the impeller and to be directed outwardly into the discharge section.

Between the blades of the impeller I provide a number of small apertures for the admission of air under pressure. The masses of material are thoroughly aerated due to the agitation of the impeller and the impingement of the jets of air, and gradually expand in the progressively increasing space between the impeller and the spiral wall of the guide casing. The centrifugal force of the material discharged by the impeller, due to the high speed of rotation, tends to direct the material along the spiral wall and into the discharge section. The curved blades, as they pass the discharge section, impact against the mass, applying pressure to the moving column of material, thereby forcing it through the conduit. As the impeller does not tend to churn, relatively low pressure of air can be used and it follows that the head of material in the hopper is sufficient to prevent the escape of considerable quantities of air through the source of material supply.

In cases wherein the material and air tend to stratify and the mobility of the former to decrease, I insert a secondary conveying apparatus in the pipe line to serve as a means of mechanically agitating and recreating the fluent condition and also to apply additional force to the moving material column. The secondary conveyer is substantially similar to the primary conveyer excepting that additional air is not necessary, as the air originally admitted through the primary conveyer is used to recreate the fluent condition, and the material conveyed is directed from the pipe line against the impeller rather than from the source of supply. The impeller is driven at a slightly higher speed than that of the primary conveyer in order to prevent the building up of back pressure in the pipe line.

The volume and pressure of air necessary to create the fluent condition is a variable factor that must be determined in each instance either by experiment or reference to similar installations. These factors vary in accordance with the quality of the material to be conveyed, its specific gravity and moisture content, and its resistance to flow. Taking as an example pulverized raw cement material, one of the commonest materials conveyed in such systems, it has been discovered that the average volume of air required is approximately four cubic feet per minute per ton hour. As a further example expressed in another way, approximately ten cubic feet of free air per cubic foot of pulverized coal is the maximum quantity necessary to create the fluent condition and this quantity includes a large factor of safety in order to be sure that no solid masses in an unaerated state are discharged into the pipe line.

The impeller of the primary conveyer should be operated at approximately 500 R. P. M., thus subjecting the material column to fifty impacts per second by the six blades, whereas the speed of the impeller of the secondary conveyer should be greater, for example 600 R. P. M. These rates are obviously subject to variation in accordance with the character of the material conveyed, the size of the apparatus, etc., and are intended merely as one example.

Figure 2:
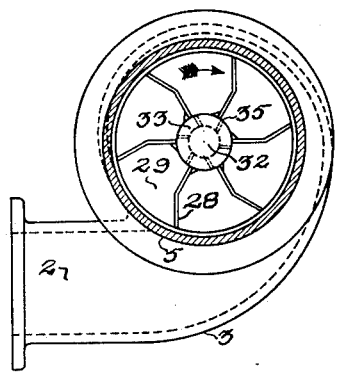

In the accompanying drawings, which illustrate a preferred embodiment of my invention, Fig. 1 is a cross-sectional elevation of the primary conveyer, Fig. 2 is a sectional plan view on line 2—2 of Fig. 1, Fig. 3 is a cross-sectional elevation of the secondary conveyer, Fig. 4 is a sectional plan view on line 4—4 of Fig. 3, and Fig. 5 is a side elevation showing the general arrangement of my invention.

With specific reference to the drawings, and particularly to Fig. 1, the conveying apparatus is seen to consist of a hollow guide casing 1, having rectangular discharge orifice opening into the off-set discharge section 2, the outer wall 3 of which is a continuation of the flat vertical spiral wall of the guide casing, the outer end of the section being of circular cross-section of the same diameter as the pipe line. The spiral wall above noted is preferably covered with a thin lamination of the alloy known as stellite, a material well known in the art for its quality of resisting abrasion. This alloy contains chromium and cobalt, is not materially worn by abrasive materials such as pulverized rock and cement, and can be secured either in thin sheets or by welding to the inner surface. The inlet side 4 of the casing is provided with a circular aperture opening into a hollow cylindrical hopper 5, provided with a slide gate 6, moving in channels 7, formed in the inner walls of the hopper 5.

The hopper 5, may be connected to any suitable source of material supply such as the discharge spout of a pulverizer mill, a short screw conveyer receiving the discharge from a plurality of pulverizers or a storage bin such as that indicated generally at 8. In order to insure a continuous gravity delivery of materials to the casing, I prefer to arrange the apparatus vertically, but it is to be understood that if necessary to meet installation requirements, the conveyer may be operated in horizontal position.

A driven shaft 9 is positioned concentrically with respect to the axis of a spiral wall of the guide casing 1 and passes through the base 10. The shaft is supported and aligned by the following bearing mechanism: A hollow bearing block 11 is secured to the under surface of the base 10 and is provided with at least three cylindrical chambers of progressively decreasing diameters toward the upper end to form shoulders for retaining the bearings in position. In the upper chamber I provide a felt grease ring or gasket 12, and in the next adjacent chamber a guide bearing 13 in the form of complementary ball bearings secured by the shoulder 14 and the retaining ring 15. Below the guide bearing is a combined thrust and guide bearing, comprising a collar 17 having an aperture 18, clearing the shaft 9 to permit the flow of grease into the upper bearing. The collar 17 is restrained from upward movement by the shoulder 19. Secured within a groove 20 in the shaft 9 is a thrust collar 21 supported by ball thrust bearings 22 and 23, longitudinal motion of the shaft being prevented by the bearing races 24 and 25. The bearing assembly is retained in position by a cover plate 26 secured to the bearing block 11. The cover plate is provided on its inner surface with a circular boss 26' abutting against the collar 17 to lock the latter in position, and is provided with packing glands 27 to prevent the outward flow of grease along the shaft.

The impeller comprises a plurality of blades 28, six being the preferred number, suitably secured to the shaft 9 as well as the disc 29, by welding or otherwise. The blades 28 are preferably curved backwardly from the direction of rotation of the impeller as indicated by the arrow in Fig. 2 in order to increase the tendency of the material to be discharged tangentially. The effective surfaces of the blades are also provided with a lamination of stellite to resist abrasion.

Air for creating the fluent or aerated condition in the material is led to the system through a piping arrangement, to be described in detail hereinafter, and passes into the conveyer through a bore 30 in the base 10 and into the cylindrical chamber 31. The driven shaft 9 is provided with a hollow cylindrical bore 32 in its upper portion, closed by a conical cap screw 33. The air is forced into the bore 32 through a plurality of apertures 34 and discharged into the material in the casing through a plurality of smaller apertures 35 in the shaft between the blades of the impeller. The apertures 35 are of small diameter in order that the air will be injected at high velocity to assist the blades in breaking up the mass of material and creating the fluent condition with a minimum volume of air.

In order to prevent the entrance of abrasive dust to the bearing mechanism and to prevent friction between the disc 29 and the base 10, the shaft 9 is surrounded by a bronze bushing 36 secured in a recess in the base 10 and forming a closure for the chamber 31. The clearance between the bushing and the shaft should not be less than what is commonly known as a running fit in order that a small quantity of pressure air will escape from the chamber and flow upwardly beneath the disc and resist the tendency of the dust to flow into the space below it. The apparatus may be driven by any suitable means such as a vertical motor (not shown) through the usual flexible coupling indicated at 37.

Referring to Figs. 3, 4, and 5, the secondary or re-aerating conveying apparatus is seen to consist of apparatus similar to the primary conveyer except that the arrangement for admitting air for purposes of aeration has been omitted. The material enters the guide casing 41 through an inlet 42 connected to the pipe line and is directed at right angles against the blades 43 and disc 44 of the impeller 45. The change in direction of the material flow, the impact of blades and the centrifugal effect serve to recreate the condition of thorough aeration. The impeller is rotated at speeds slightly higher than the inlet velocity in order to avoid back pressure in the pipe line and the impact of the blades serves to propel the material column through the pipe line to the next secondary conveyer or to the receiving bin.

The bearing assembly is designed so that it may be packed with grease under the pressure of the grease gun 46, but in the event that the conveyer conduit is parallel with a compressed air line, I prefer to admit a small quantity of pressure air through the bore 49 to create a countercurrent around the shaft at 50, to flow outwardly beneath the disc 44 to preclude the entrance of abrasive dust to the bearing and to prevent friction between the disc and the guide casing.

The relative arrangement of the conveying device and the related apparatus is shown in Fig. 5. Air from any suitable source such as a compressor or receiver not shown, is admitted to the piping system through a main supply pipe 51 under control of valve 52. The air then passes into the apparatus through pipe 53, pressure reducing valve 54 and cut-off valve 55. For emergency uses the air may be diverted around the reducing valve when the pressure is low through T 56, cross 57, cut-off valve 58, and into the pipe 53, the latter being threaded into the bore 30 shown in Fig. 1. A pressure gauge 59 on the panel 60 indicates the pressure of the air supplied to the bore 30. This gauge is preferably connected by means of copper tubing to a point in the pipe 53 on the discharge sides of valves 55 and 58. A pipe line blow out valve 61 is secured to the discharge section 2 and is operated by means of a lever 62. The valve is preferably of the disc and port type and is provided in order that the pipe line may be shut off from the conveyer for purposes of admitting high pressure air to blow the line clear of material when the conveyer is stopped. Between the pipe line proper, that is the pipe 63, and the blow out valve I arrange a blow out connecting pipe 64 to which is connected a pipe 65 through which air may be admitted under the full pressure of the supply line under the control of valve 66. A gauge 67 connected in the pipe line 65 by means of copper tubing 67' indicates the maximum pressure available at all times. In order that the apparatus may be controlled properly, a small standpipe 68 is secured to the nozzle 64 and connected by a copper tube 69 to the gauge 70 to indicate the pressure under which the transport line is operating.

In certain cases where a number of diverting valves and secondary conveyers are employed an emergency blow out line 71 controlled by valve 72 may be used which will parallel the main pipe line 63. Air may be directed through pipe 71 to the various valves and secondary conveyers to blow the parts free of dust and may be turned on continuously during operation of the secondary conveyers into the bearing assembly to form a counterflow of air outwardly along the shaft and into the casing through pipe 73 leading to the bore 49 to resist the entrance of dust. The small quantities of air employed will not materialy affect the condition of the material in the pipe line.

The operation of the apparatus is as follows:

The bin gate 6 is closed. The motor is started and the apparatus run empty until the impeller has been brought up to normal speed. The air is then turned on through valve 52, through reducing and cut-off valves 54 and 55 and thence through the impeller. The bin gate 6 is then opened and material directed into the pipe line. In cases where the air requirement in pressure and volume is unknown, as when handling a new material or starting a new installation, the air is admitted to the conveyer at relatively high pressure and gradually reduced until the needle of gauge 70 starts to rise indicating that incompletely aerated material is being admitted to the pipe line and back pressure is increasing and it follows from this that the pressure of the air admitted through the impeller has been decreased below the minimum limit. The apparatus is then stopped, the blow out valve 61 is closed and air is admitted at the highest available pressure through valve 66 into the nozzle 64 to blow the line clear. When the needle of gauge 70 approaches zero the pipe line 63 has been cleared. Operation is then resumed and the air admitted through the impeller at the lowest pressure at which the needle of gauge 70 will remain stationary, as discovered in the first experiment.

As the horsepower requirements will vary somewhat in proportion to the degree of aeration, it will be apparent that the material not thoroughly aerated will require more power from the driving motor; therefore, it is necessary to watch the ammeter in the motor circuit and if more power is being consumed by the motor, the air is gradually increased until the relation between motor power and air is the most economical. The material entering the guide casing is rapidly expanded in volume due to the absorbtion of air and is permitted to expand in the space between the impeller and the spiral wall 3 of the guide casing, which space progressively increases in cross-sectional area toward the discharge section 2.

As the impeller is driven at approximately 500 revolutions per minute, the material column will be subjected to the pressure of 50 impacts of the blades per second, amounting to a substantially continuous application of pressure to the material column. The secondary conveyer will operate in order to give the column approximately 60 impacts per second in order to increase velocity somewhat and prevent back pressure against the preceding impeller. In most installations the secondary conveyer will not be needed and will be installed only when necessary to recreate the aerated condition. In such cases the conduit will be given a 45 degree angle bend leading to the secondary conveyer which will discharge into a similar 45 degree angle bend so that the material will be carried forward in substantially the same general direction. The secondary conveyer, however, will often be installed where a right angle bend is necessary and in such cases the pipe lines may run straight.

After the motor has been stopped it will be apparent that there will be a considerable quantity of material remaining in the pipe line and that if it is not discharged, the air will gradually escape and the material will return to its original dense condition. In such cases the blow out valve 61 is closed and air under high pressure admitted through valve 66, the pressure of air serving to blow out the material. As soon as the needle of the guage 70 drops to or near zero, indicating that the line is clear, the flow of high pressure air is stopped and the blow out valve again opened.

I claim:

1. Apparatus for conveying pulverized material comprising the combination of a guide casing having an inlet for material to be conveyed, a discharge section, a flat wall opposite to the inlet, an impeller within the casing comprising a plurality of blades secured to a driven shaft, the shaft passing through the flat wall and supported in bearings on the outer side of said wall, the shaft being provided with a plurality of small apertures opening into a central cylindrical bore, means for admitting air under pressure to the casing through the apertures, the blades serving to agitate the material in the presence of air to create a fluent mixture and to force the mixture into the discharge section.

2. Apparatus for conveying pulverized material comprising the combination of a guide casing having an inlet for material to be conveyed, a discharge section, a flat wall opposite to the inlet, an impeller within the casing comprising a plurality of blades secured to a driven shaft, the shaft passing through the flat wall and supported in bearings on the outer side of said wall, the shaft being provided with a plurality of small apertures opening into a central cylindrical bore, means for admitting air under pressure to the casing through the apertures, the blades serving to agitate the material in the presence of air to create a fluent mixture and to force the mixture into the discharge section and means for admitting additional air under pressure into the casing to prevent the flow of material along the shaft and into the bearings.

3. Apparatus for conveying pulverized material comprising the combination of a guide casing having a vertical side wall in the form of a spiral continued to form a wall of a discharge section, for the casing, means for admitting material to be conveyed to the casing through an inlet provided in the upper wall thereof, the casing having a flat base, an impeller within the casing comprising a driven shaft mounted for rotation in bearings secured to the base, the driven shaft and the spiral wall having a common vertical axis, a disc secured to the shaft adjacent to the base, a plurality of blades secured both to the shaft and disc, the shaft being provided with a hollow central bore, a plurality of apertures for the admission of air to the bore and a plurality of small apertures opening from the bore into the casing between the blades for the admission of air under pressure, the blades and the admitted air serving to agitate the material to create a fluent condition and to propel the material through the discharge section.

4. Apparatus for conveying pulverized material comprising the combination of a guide casing having an inlet for material to be conveyed, a discharge section and a flat wall opposite to the inlet, an impeller within the casing comprising a plurality of blades secured to a driven shaft, the shaft extending through the flat wall and supported in bearings on the outer side of said wall, the shaft being provided with a plurality of apertures opening into a central cylindrical bore, means for admitting air to the central bore through certain of said apertures, the air being discharged into the casing through other of said apertures opening into said bore between the blades.

5. Apparatus for conveying pulverized material comprising the combination of a guide casing having a discharge section, means for admitting material to be conveyed to the casing, the casing having a side wall in the form of a spiral continued to form a wall of the discharge section and a flat wall, an impeller within the casing comprising a driven shaft supported in bearings on the outer side of the flat wall, a plurality of blades secured to the shaft, the shaft being provided with a hollow central bore, a plurality of apertures for the admission of air to the bore and a plurality of small apertures opening from the bore into the casing for discharging the air into the casing, and means for admitting additional air to the casing along the shaft to prevent a flow of material along the shaft and into the bearings.

In testimony whereof, I affix my signature.

CHARLES M. SCHAEFFER.